(12) United States Patent
Hull (10) Patent No.: US 8,341,041 B2
(45) Date of Patent: Dec. 25, 2012

(54) METHOD AND APPARATUS FOR AUTOMATED MEDICAL SUPPLY TAKE/STORE TRACKING

(75) Inventor: Christopher Hull, La Mesa, CA (US)

(73) Assignee: CareFusion 303, Inc., San Diego, CA (US)

( * ) Notice: Subject to any disclaimer, the term of this patent is extended or adjusted under 35 U.S.C. 154(b) by 216 days.

(21) Appl. No.: 12/500,499

(22) Filed: Jul. 9, 2009

(65) Prior Publication Data
US 2011/0010275 A1    Jan. 13, 2011

(51) Int. Cl.
*G06Q 10/00* (2012.01)
(52) U.S. Cl. .................. 705/28; 705/7; 705/1; 340/5.2; 235/382; 221/133
(58) Field of Classification Search .................. 705/28, 705/7, 1; 312/237, 215; 340/5.2, 522, 531; 235/382
See application file for complete search history.

(56) References Cited

U.S. PATENT DOCUMENTS

| | | | |
|---|---|---|---|
| 6,169,483 B1 | 1/2001 | Ghaffari et al. | |
| 7,298,264 B1 | 11/2007 | Kuzma et al. | |
| 7,537,155 B2* | 5/2009 | Denenberg et al. | 235/382 |
| 7,844,509 B2* | 11/2010 | Bodin et al. | 705/29 |
| 2002/0091824 A1* | 7/2002 | Anderson et al. | 709/225 |
| 2006/0028352 A1* | 2/2006 | McNamara et al. | 340/825.49 |
| 2006/0139149 A1* | 6/2006 | Faro et al. | 340/5.73 |
| 2006/0149605 A1* | 7/2006 | Mo et al. | 705/7 |
| 2007/0115125 A1 | 5/2007 | Lyon et al. | |
| 2007/0150382 A1 | 6/2007 | Danilewitz | |
| 2007/0188303 A1* | 8/2007 | Faro et al. | 340/5.73 |
| 2009/0138303 A1* | 5/2009 | Seshadri | 705/7 |
| 2009/0222359 A1* | 9/2009 | Henry | 705/28 |
| 2009/0267772 A1* | 10/2009 | Dehnadi | 340/572.8 |

FOREIGN PATENT DOCUMENTS

| | | |
|---|---|---|
| JP | 2005263480 A | 9/2005 |
| JP | 2006096536 A | 4/2006 |
| WO | WO 99/05660 A1 | 2/1999 |

OTHER PUBLICATIONS

Australian Standard, Identification Cards—Contectless integrated circuit(s) cards—proximity cards, Part 2: Radio frequency power and signal interface, AS 14443.2-2003, ISO/IEC 14443-2-2001.
International Search Report PCT/US2010/040936 International Searching Authority, European Patent Office, Sep. 29, 2010.
Solanas, Agusti et al., "A Distributed Architecture for Scalable Private RFID Tag Identification," ScienceDirect, Computer Networks 51, 2007, pp. 2268-2279.
"International Standards Organization's (ISO) ISO-14443 Specification." Dated Nov. 24, 2008. ISO/IEC JTC1/SC17 Cards and personal identification. Secretariat ISO/IEC JTC1/SC17, APACS, Mercury House, Triton Court, 14 Finsbury Square, London EC2A 1LQ, England.

\* cited by examiner

*Primary Examiner* — Vanel Frenel
(74) *Attorney, Agent, or Firm* — McDermott Will & Emery LLP (57) ABSTRACT

A supply cabinet is fitted with an outer sensor and an inner sensor. The outer and inner sensor wirelessly sense inventory items tagged with radio frequency tags and in proximity of the sensors. A method of tracking inventory items stored in a supply cabinet includes determining, based on time sequencing of sensing by the outer and the inner sensor, if an inventory item was removed from the cabinet or stored into the cabinet, and updating an inventory database accordingly. An alarm is optionally triggered if an inventory item is removed by an unauthorized user.

18 Claims, 6 Drawing Sheets

METHOD AND APPARATUS FOR AUTOMATED MEDICAL SUPPLY TAKE/STORE TRACKING

FIELD

The present disclosure relates, in general, to inventory tracking and, more particularly, to tracking removal and storage of medical supplies from a medical supply cabinet.

BACKGROUND

In a hospital setting, medical staff is constantly removing medical supplies from a supply cabinet and placing new supplies back in the cabinet. It is a common practice to use some type of automation to track items in the inventory of the medical supply cabinet.

For example, in some systems referred to as "Push-to-Take" systems, a medical personnel touches either a "store" or "remove" button located on the front of a medical cabinet storage slot to indicate to an inventory tracking system whether an item in that storage slot is being removed or added to the inventory. The tracking system updates the inventory based on the input received from these button presses.

In practice, a Push-to-Take system suffers from several drawbacks. The system primarily relies on a human user to correctly note each removal or addition of an inventory item. This could result in erroneous inventory tracking resulting from human errors. Secondly, when adding/removing multiple inventory items from the same storage slot, the system requires the human user to press the store/remove button multiple times. A mismatch between the number of items and the number of key presses is another potential source of error in the system. The system also breaks workflow continuity of the medical personnel because instead of simply opening the cabinet door and placing new items in a storage bin or removing items from a storage bin, the user now has to stop and press buttons the correct number of times. Furthermore, when multiple inventory items of the same type with different lot and serial numbers are stored, a user must enter the lot and serial number information for each item at load time and select which particular item was removed at the time of taking the item out.

In another inventory tracking system, each item in the storage is tagged with a unique radio frequency (RF) tag. When the door to a medical cabinet is in the closed position, the inventory tracking system performs an RF scan of the cabinet to detect the items currently present in the cabinet. The inventory tracking system then compares the results of this detection with previous results to decide which items were added to the cabinet and which items were removed from the cabinet. This system is sometimes referred to as an "All Cabinet Scan" system.

In practice, an All Cabinet Scan system has certain shortcomings. For example, the cabinet scan can sometimes miss inventory items. This can happen, for example, if one inventory item is occluded by another inventory item. Furthermore, an All Cabinet Scan system may be "spoofed" by a user accidentally or intentionally holding an inventory item in proximity of a closed cabinet door so that the RF scanning counts the item as being in the inventory. To avoid such "spoofing," the scanning process may be designed to be less sensitive to inventory items present near the cabinet door area. However, this limits the available storage space for the cabinet. Another shortcoming of the All Cabinet Scan is that for low error scanning, high power RF transmissions are needed. Thus, an All Cabinet Scan system is a large power consumer. Also, to keep the RF transmissions of the scanner from interfering with other radiation-sensitive equipment around the cabinet, the cabinet may have to be fitted with expensive electromagnetic shielding such as a Faraday cage. Another disadvantage of the All Cabinet Scan system is that the RF transmissions of the scanner could potentially harm RF-sensitive medical devices (e.g., pacemakers) that need to be stored inside the medical cabinet. Also, because the All Cabinet Scan system performs inventory check after the cabinet door is closed, it cannot immediately notify a user if the user takes out an expired medication item.

SUMMARY

There is a need for an inventory tracking system that is not disruptive of a medical personnel's task of storing/removing medical supplies to/from a medical cabinet and also eliminates scan errors in tracking items in a medical supply cabinet.

This and other needs are met by disclosed embodiments which provide a low power inventory item tracking system that eliminates the need to have a user perform key presses or align inventory items in a special manner to facilitate inventory tracking.

The earlier stated need and others are also met by embodiments of the present invention which provide an inner RF sensor and an outer RF sensor fitted to a medical supply cabinet to determine directionality of movement of an inventory item.

The earlier stated need and others are also met by still other embodiments that provide a method of tracking inventory items by determining if an inventory item is being stored or removed by using temporal information from signals from an inner sensor and an outer sensor.

In a first exemplary aspect, a storage apparatus comprising a storage cabinet configured to store a plurality of inventory items, a first sensor having a first zone of sensing, and a second sensor having a second zone of sensing wherein the first zone of sensing in an outward direction of the storage cabinet compared to the second zone of sensing, and wherein the first sensor and the second sensor are configured to sense an inventory item in the first zone of sensing and the second zone of sensing respectively is disclosed.

In one exemplary embodiment, the first and the second sensor are configured to communicate a sensory message to a processor, the sensory message having an item-dependent portion and an item-independent portion.

In a second exemplary aspect, a method of tracking inventory of items stored in a supply cabinet is disclosed, the method comprising receiving, at a computer, a first sensing message from a first sensor and a second sensing message from a second sensor; and updating, at the computer, an inventory database for items in the supply cabinet, wherein the updating is responsive to a spatial placement of the first sensor and the second sensor and time instants of sensing the inventory item at the first sensor and the second sensor.

In a third exemplary aspect, a secure storage apparatus for storing a plurality of inventory items comprising a supply cabinet with a door, a first sensor positioned inside the door, a second sensor positioned between the door and the first sensor, and a computer communicatively coupled with the first sensor and the second sensor, wherein the first sensor and the second sensor are configured to sense proximate inventory items and communicate corresponding sensory messages to the computer, wherein the computer is configured to restrict a user's ability to open the door, determine, based on sensory messages received from the first sensor and the second sensor, if a high value inventory item was removed, and turn on an alarm if the user opening the door was not authorized to remove the high value inventory item is disclosed.

The foregoing and other features, aspects and advantages of the embodiments of the present invention will become more apparent from the following detailed description and accompanying drawings.

DETAILED DESCRIPTION

The embodiments of the present disclosure address and solve problems related to the inventory tracking of supplies in a supply cabinet. The embodiments find particular utility in the medical field, for example, to store and track medical supplies in a medical supply cabinet. In particular, the embodiments of the disclosure overcome limitations of previous inventory tracking systems regarding certain limitations related to the requirement for a user to press keys and/or erroneous cabinet scans. Embodiments achieve this, in part, by providing multiple sensors positioned in a supply cabinet to track items being removed or stored by sensing the items and determining directionality of the movement of the items. For example, in certain embodiments, a supply cabinet has at least an inner sensor and an outer sensor. If an inventory item is sensed first by the outer sensor, followed by the inner sensor, then the item is considered to have been stored in the supply cabinet. If an inventory item is sensed first by the inner sensor followed by the outer sensor, then the item is considered to have been removed from the supply cabinet. As used herein, the terms "store" and "remove" respectively describe the actions of "taking" and "returning" inventory items from a cabinet.

Figure 6:
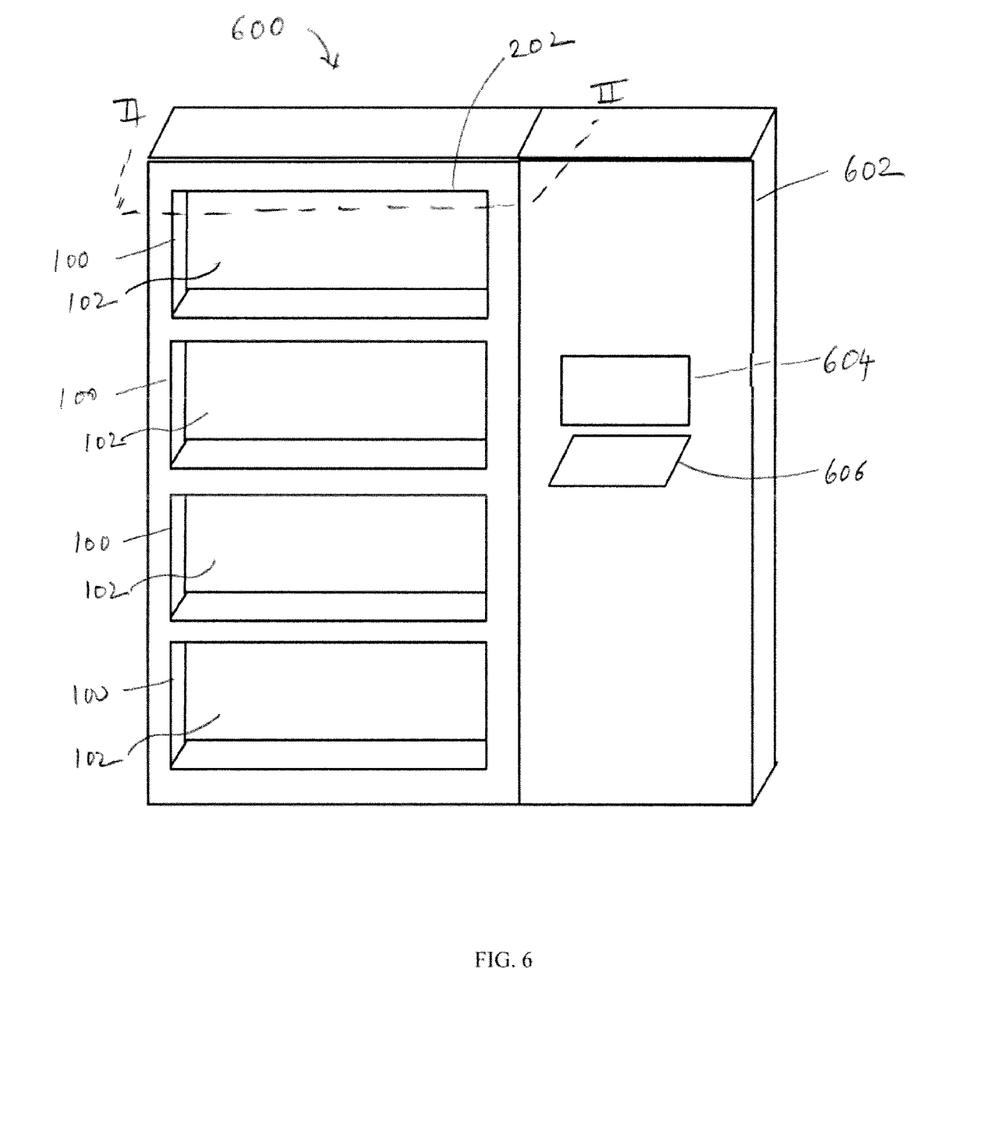
FIG. 6 is a front view of a storage cabinet apparatus in accordance with embodiments of the present invention.

FIG. 6 is a front view of a supply cabinet 600 that has a number of cabinet compartments 100, each having a cabinet shelf area 102. The cabinets 100 are covered by a door 202. In some embodiments, the supply cabinet 600 may have a single door 202 covering all cabinet compartments 100. In other embodiments, each cabinet compartment 100 may have a separate door 202. In other embodiments, no door is provided, although this reduces security in such embodiments. The supply cabinet 202 may also have a control cabinet 602 in proximity. The control cabinet 602 may include a user interface 604, such as a computer monitor, and a data entry apparatus 606, such as a keyboard. The data entry apparatus and the user interface 604 may be part of a computer (not shown in the figure) that is used to control access to the supply cabinet 600.

While the following description describes various embodiments primarily in the context of medical supplies, it will be understood that the discussion applies to a supply cabinet that stores any type of items.

Figure 1:
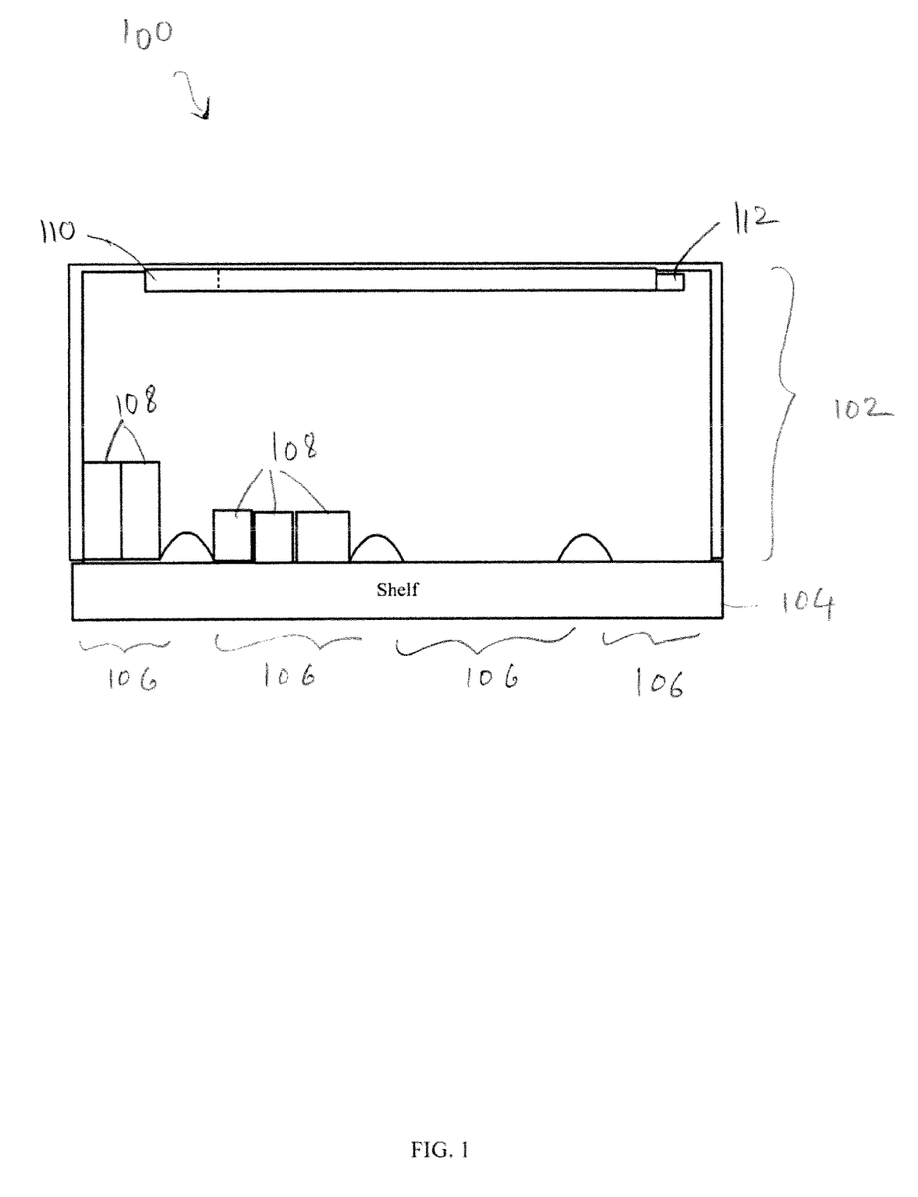
FIG. 1 is a block diagram showing a front view of a medical cabinet apparatus in accordance with embodiments of the present invention.

FIG. 1 is a front view of one of the cabinet compartments 100 showing a cabinet shelf area 102. Each cabinet shelf area 102 comprises a cabinet shelf 104 and may include one or more storage bins 106 configured for storing a plurality of inventory items 108. The cabinet shelf area 102 is fitted with at least two sensors: a first sensor 110, henceforth termed the outer sensor 110 because it is positioned closer to the opening of the cabinet shelf area 102, and a second sensor 112, henceforth termed the inner sensor 112 because in relation to the outer sensor 110, the second sensor is positioned further inside the cabinet shelf area 102. Other cabinet shelf areas 102 (not shown in FIG. 1) in the cabinet apparatus 100 may also be fitted with their own inner and outer sensors. In certain exemplary embodiments, each sensor is a coil wound around the perimeter of the cabinet shelf area 102. In other embodiments, each sensor may comprise multiple sensing elements electrically connected together to form a single sensing unit.

Figure 2:
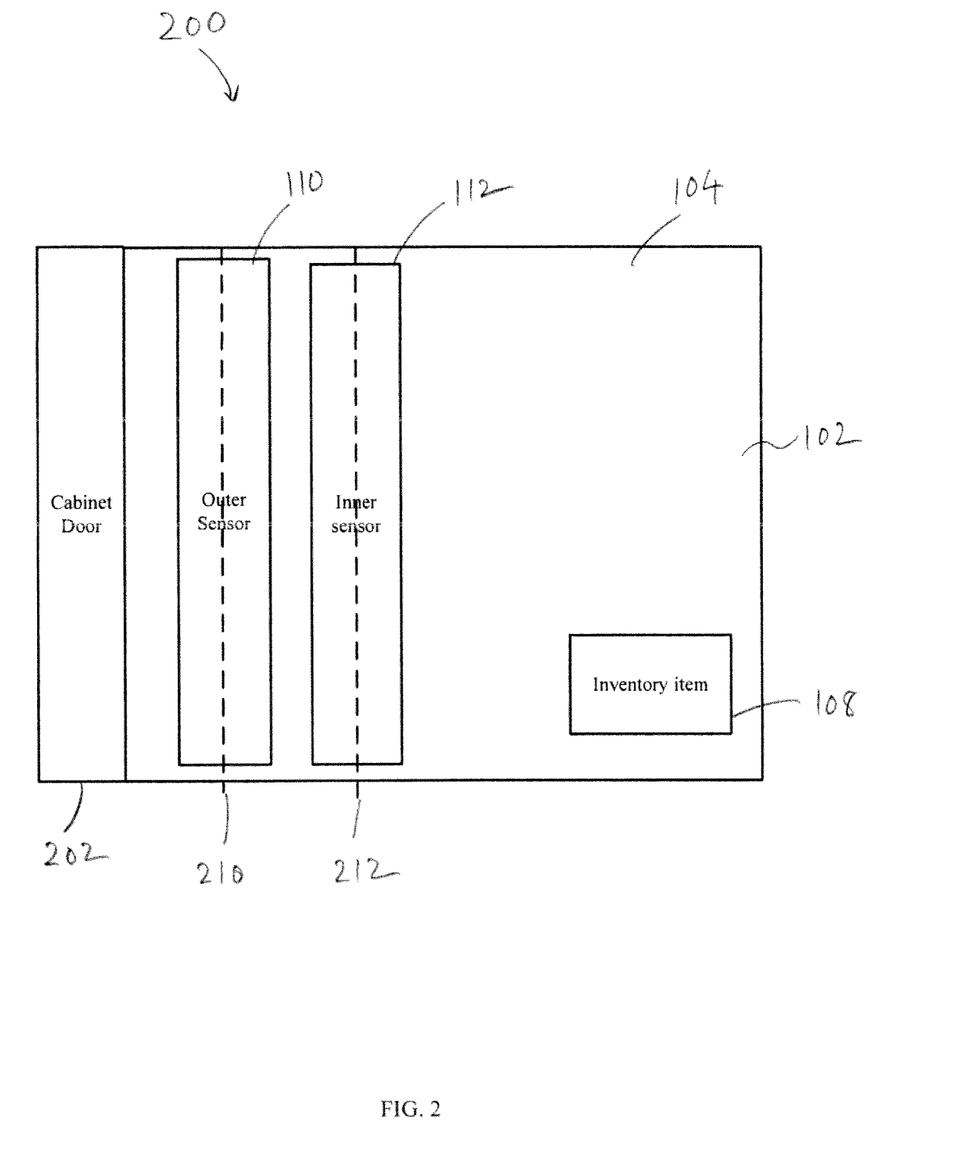
FIG. 2 is a block diagram showing a top view of a medical cabinet apparatus in accordance with embodiments of the present invention.

FIG. 2 shows a top partial view 200 of the cabinet compartment 100 depicting relevant components from the top cabinet shelf space 102 of FIG. 6, taken along lines II-II. The outer sensor 110 is positioned closer to the cabinet door 202 compared to the inner sensor 112. While the embodiment shown in FIG. 2 is of a supply cabinet having a cabinet door 202, the present invention can also be implemented in embodiments where no cabinet door 202 is present. In such an embodiment, the front of the supply cabinet apparatus 600 will be open and inventory items 108 will be accessible to a user without having to open a door.

The sensors 110 and 112 are positioned such that compared to the inventory items 108, both the sensors 110 and 112 are in the outward direction of cabinet shelf area 102. That is, the sensors 110 and 112 are closer to the cabinet door 202 than the inventory items 108. One skilled in the art will recognize that such a placement of sensors 110 and 112 means that removal or placement of each inventory item 108 in the cabinet shelf area 102 requires physical movement of the inventory item in proximity of each sensor 110 and 112. While the precise configuration of the sensors 110 and 112 may be varied in different embodiments, the sensors 110 and 112 should preferably be electrically configured to sense items being moved in or out from anywhere within the cabinet shelf area 102. In other words, the sensors 110, 112 should be configured to sense movement of an inventory item 108 whether the item is being removed near the center of the cabinet shelf area 102, or either side, or the top or the bottom of the cabinet shelf area 102. In some embodiments, the sensors 110 and 112 may be in the form of a coil that wounds around the perimeter of the cabinet shelf space 102. In other embodiments, the sensors 110 and 112 may be shaped like strips attached to one or more of the top, bottom or sides of the cabinet shelf space 102.

In general, the exact shape and placement of the sensors 110 and 112 is not significant, as long as the sensors have a zone of sensing whereby the sensor can accurately sense an inventory item in the zone of sensing. In one embodiment, the sensing may be performed using magnetic field detection. In another embodiment, a radio frequency (RF) technology is used to sense the inventory items 108 having an RF tag. As the RF tag passes through the zone of sensing of the sensor, a sensing is made. In yet another embodiment, the sensing technology used comprises the Near-Field Communication (NFC) technology such as described in the International Standards Organization's (ISO) ISO-14443 specification. Use of other well known short range communication technologies such as Bluetooth, ultra-wideband (UWB) is employed in other embodiments. The outer sensor 110 has an outer zone of sensing shown as a line 210 in FIG. 2. The inner sensor 110 has an inner zone of sensing shown as a line 212 in FIG. 2. The zones 210 and 212 generally extend downwards from the top of the cabinet shelf area 102 to the cabinet shelf 104 and cover substantially the entire opening of the cabinet shelf area 102. The zones 210 and 212 are "imaginary" zones because they are not visible or noticeable to a user, but merely represent a zone of sensitivity of the corresponding sensor. For example, any RF tag that is within the zone of sensing 210 will be sensed by the outer sensor 110. Similarly, any RF tag that is within the zone of sensing 212 will be sensed by the inner sensor 212. In a preferred embodiment, the zones 210 and 212 are substantially planar, covering substantially all of the opening of the cabinet shelf space 102 so that no inventory item 108 can be removed from or stored into the cabinet shelf area 102 without being sensed by both the outer sensor 110 and the inner sensor 112.

Figure 3:
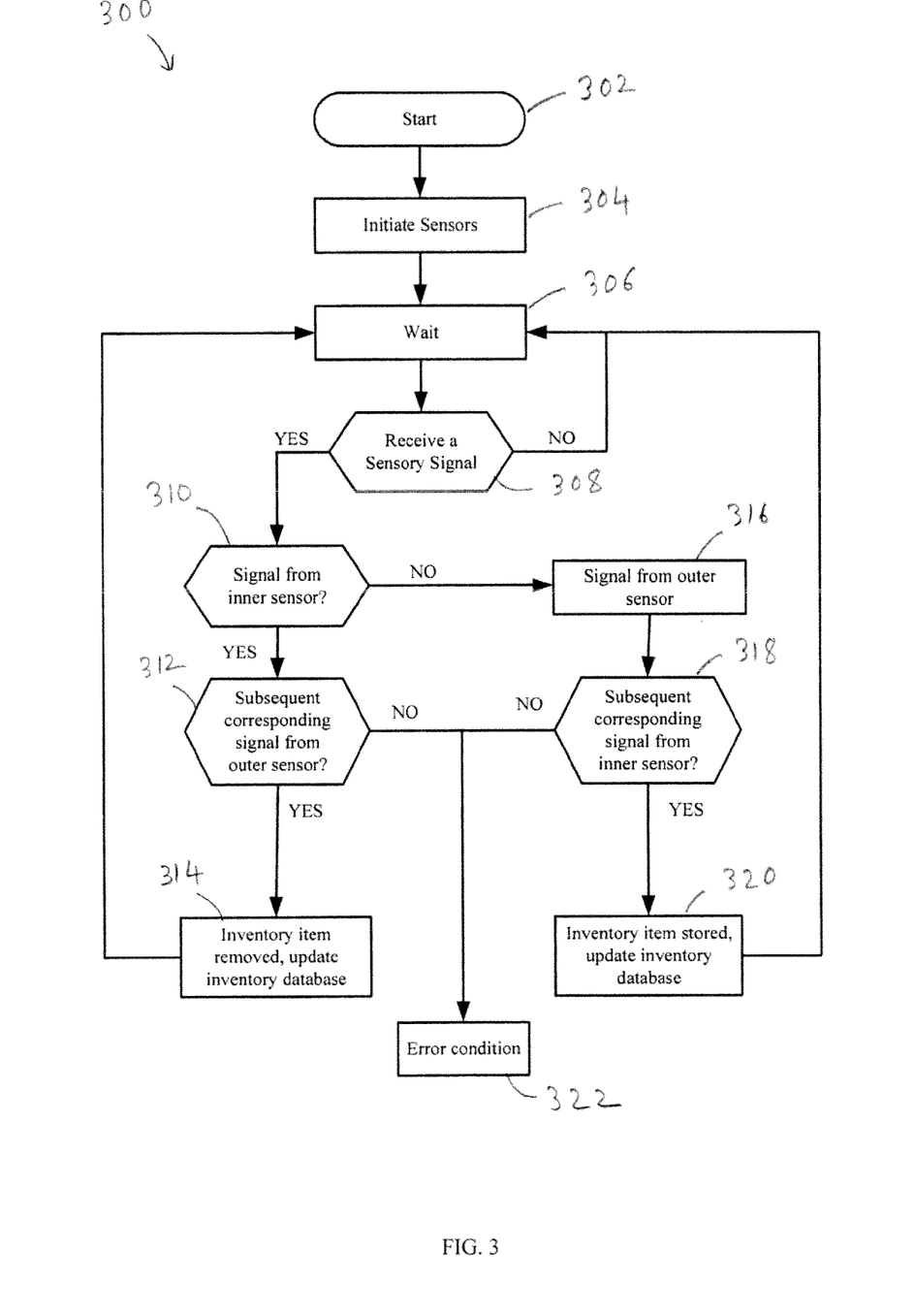
FIG. 3 is a flow chart of the steps of an inventory tracking method in accordance with embodiments of the present invention.
Figure 5:
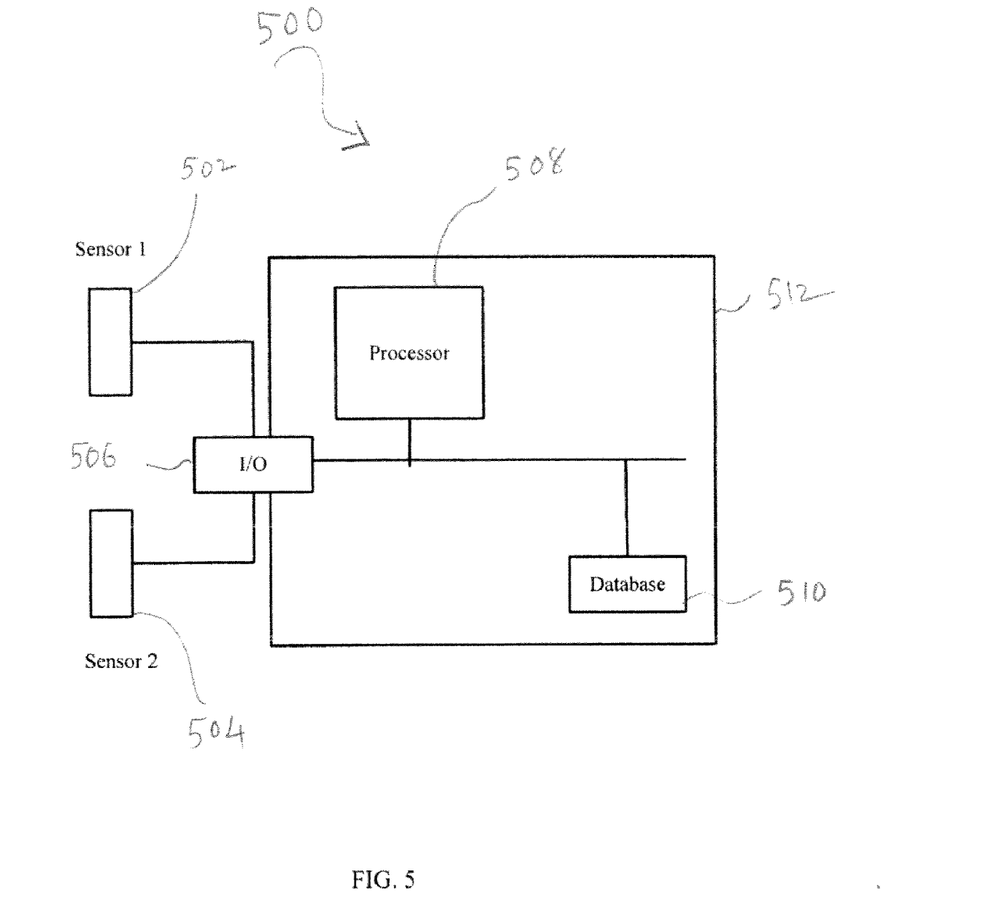
FIG. 5 is a block diagram of an inventory tracking apparatus in accordance with embodiments of the present invention.

FIG. 3 is a flow chart 300 of a method of tracking inventory items according to discussed embodiments. This method is implemented on a processor communicatively coupled with the sensors 110 and 112. The processor 508 is depicted in FIG. 5. The sensors 110 and 112 are configured to send a signal to the processor 508 in response to sensing an inventory item 108 in their zones of sensing respectively. At start (step 302) the processor 508 initiates the sensors 110 and 112 in step 304. The processor 508 then performs other tasks while it waits to receive sensory signals comprising sensory messages from sensors 110 and 112. In step 308, the processor 508 receives a sensory signal. The processor 508 determines identity of the sensor that sent the sensory signal. In step 310, the processor 508 checks if the sensory signal came from the inner sensor 112. If the answer is "YES," then, in step 312, the processor 508 waits to receive a subsequent signal from the outer sensor 110. Upon reception of a corresponding sensory signal (a sensory signal indicating identity of the same inventory item 108 indicated in the step 310 sensory signal) from the outer sensor 110, the processor 508 determines in step 314 that the inventory item was removed from the supply cabinet 600. The processor 508 updates an inventory database to indicate the inventory item 108 stored. The processor 508 then waits in step 306 to receive additional sensory messages. In certain embodiments, the processor 508 may be programmed to issue an alarm if the inventory item 108 removed was of a certain predetermined type. For example, in certain embodiments, the processor 508 may issue an alarm if the inventory item 108 removed was a recalled item not fit for use. In certain other embodiments, the processor 508 may issue an alarm if the inventory item 108 removed was an expired medication. The processor 508 may make the determination regarding whether the inventory item 108 belongs to the predetermined list based on the identity and other information received for the inventory item 108 in the corresponding sensory signal.

The sensory signal may include a sensory message. In certain embodiments, the sensory message may have at an item-dependent portion and an item-independent portion. The item-dependent portion may include a character string, a unique identification and item attributes such as lot number, expiration date, manufacturer's identity, etc. The item-independent portion may include a timestamp corresponding to the time instant of acquisition of the sensory signal by a sensor, identity of the sensor and other data useful for system diagnostics.

Still referring to FIG. 3, if in step 310, the processor 508 determines that the sensory signal received was from the outer sensor 110 (step 316), then the processor 508 waits, in step 318, to receive a corresponding sensory signal (a sensory signal indicating identity of the same inventory item 108 indicated in the step 316 sensory message) from the inner sensor 112. Upon reception of a corresponding sensory signal, the processor 508 determines in step 320 that the inventory item 108 was stored in the supply cabinet 600 and updates the inventory database accordingly. The processor 508 then returns to step 306 and awaits reception of further sensory messages.

Still referring to FIG. 3, in steps 312 and 318, the processor 508 may timeout if it does not receive the expected sensory message. For example, in some embodiments, the processor 508 may, after receiving a sensory message from the inner sensor 112, wait for 2 seconds to get a corresponding sensory message from the outer sensor 110. If the processor 508 does not get this expected message, the processor 508 may consider this as an error condition. In response to the error condition, in step 322 the processor 322 may perform actions such as reporting the error to a user, logging the error or running diagnostic routines to perform a system check. In other embodiments, the processor 508 may not use the timeout mechanism described above. In these embodiments, the processor 508 waits practically eternally to receive the corresponding message from the second sensor.

Figure 4:
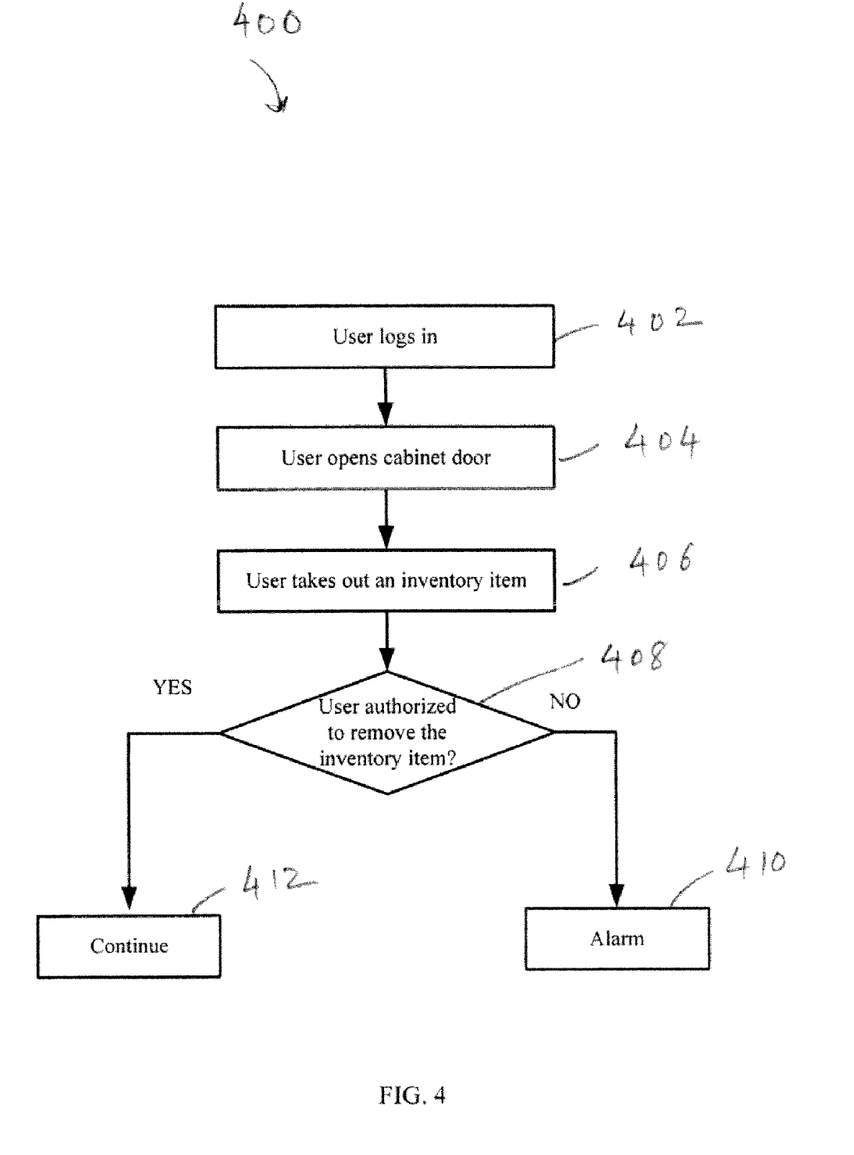
FIG. 4 is a flow chart of the steps of a secure inventory tracking method in accordance with embodiments of the present invention.

FIG. 4 is a flow chart 400 showing exemplary steps of a method of providing secure inventory storage. This embodiment is implemented at secure a supply cabinet 100 with a cabinet door 202. The door 202 is configured to be under the control of the processor 508 and cannot be opened without authorization from the processor 508. In step 402, a user logs in by providing credentials to the processor 508 that controls access to a storage cabinet. The processor 508 may use any of several well known user authentication techniques, including, but not limited to, presentation of correct username/password combination and biometric authorization, etc. In certain embodiments, the processor 508 may maintain a record of login activities. The processor 508 may provide this record to a facility manager in-charge of the storage cabinet security. In step 404, the user is successfully authorized and opens the cabinet door 202 to the secure supply cabinet 100. The secure locking of the cabinet door 202 could be achieved, for example, using a relay mechanism that unlocks the cabinet door 202 when a user successfully logs in.

Still referring to FIG. 4, in step 406, the user removes an item 108 from the cabinet shelf area 102 after opening the door 202. The cabinet shelf area 102 is equipped with an inner sensor 112 and an outer sensor 110, as described above. As described above, the outer sensor 110 and the inner sensor 112 are configured to sense inventory items in proximity and communicate a corresponding sensory message to the processor 508. Using one of the various embodiments described for tracking inventory items stored in a supply cabinet 600 described above, the processor 508, upon reception of a sensory message, becomes aware of the identity of an inventory item 108 being removed. In step 408, the processor determines if the user opening the cabinet door 202 was authorized to take out that particular inventory item 108. This determination can be made using a variety of techniques. For example, in a hospital setting, certain medications or surgical tools are only authorized for removal by a doctor or an operation room nurse. Each user is assigned an authorization level. The user's login identity provides the processor 508 information to check, from an authorization database, the authorization level of the user. Furthermore, each inventory item 108 has a corresponding lowest level of user authorization level that can remove the item 108 from the supplies cabinet 600. In certain embodiments, this information may be embedded in the sensory message from the sensor 110, 112 to the processor 508. In certain embodiments, this information may be generated by the processor 508 from a database of authorization levels. In other embodiments, access to an item 108 may be restricted to a specific user authorization level, and no other user authorization level (higher or lower) is allowed to remove the item 108 from the supply cabinet 100.

Still referring to FIG. 4, if in step 408, the processor 508 determines that the user was authorized to remove the inventory item 108, the processor 508 proceeds to step 412 to continue with next tasks such as updating the inventory database. If the processor 508 determined that the user was not authorized to take out the inventory item 108, the processor 508 then may issue an alarm and/or notify security. In various embodiments, this alarm is an audible sound, such as a tone or a beep, or a visual indication such as a light on a user interface. The light may also be located on the supply cabinet from which the inventory item 108 was removed. The alarm may also be "passive" and the processor 508 may only record unauthorized item removals by a user for a subsequent audit check. In certain embodiments, the processor 508 may be also programmed to issue an alarm if the inventory item 108 removed was unsuitable for use, e.g., expired medication or recalled product. The processor 508 may make the determination regarding whether the inventory item 108 is unsuitable for use based on the identity and other information received for the inventory item 108 in the corresponding sensory message It will be recognized by one skilled in the art that the automated detection of removal of inventory items 108 using the inner and the outer sensors 112 and 110 provide secure access to inventory items 108. In certain embodiments, the sensory messages may also include diagnostic information regarding signal quality, which may be useful to an installer to calibrate and configure the sensors so that generation of spurious sensory messages is minimized.

FIG. 5 shows an inventory tracking apparatus 500. A first sensor 502 and a second sensor 504 are communicatively coupled through an input/output port 506 to a processor 508. The processor 508 is in communication with a database 510. The processor 508 and the database 510 may both be part of a computer 512. The apparatus 500 may also include a user interface (not shown in FIG. 5) to provide information about the inventory tracking system to the user. The user interface may also include alarms such as an audio generator, a video signal generator (e.g., an LED light) or a message written to a computer screen. The inventory database 510 is configured to store identities of inventory items received along with other useful information such as a time stamp associated with the time instant of sensing of the inventory item 108, a human readable description of the inventory item (e.g., "Stent by Acme Corporation") and other information useful to the medical personnel. In certain embodiments, the inventory tracking apparatus 500 may be programmed by an operator (not shown in the figure) to raise different levels of alarms for different errors. For example, the inventory tracking apparatus 500 may validate whether the user that opened a certain medical cabinet shelf was authorized to remove or store a certain type of inventory item 108. For example, some errors may be programmed to be high priority (e.g., unauthorized removal of prescription medicine) while other errors may be programmed to be low priority (e.g., unauthorized removal of a low value medical supply item such as a syringe). Low priority errors may only be logged in an event log. The log may, for example, include an identity of the user that opened the medical cabinet and a description of the inventory item removed.

While embodiments of the invention are depicted in FIG. 1-6 with one inner sensor and one outer sensor, one skilled in the art will recognize that other embodiments consistent with the present disclosure may have multiple sensors collectively performing the inner and outer sensory functions. Furthermore, using currently known antenna design techniques, it is possible that a first sensor positioned closer to the interior of a cabinet with respect to a second sensor will have its zone of sensing close to the exterior of the cabinet in comparison with the zone of sensing of the second sensor. One skilled in the art will recognize that the positioning of the zone of sensing is more important to the embodiments of the present invention that the actual positioning of the sensors themselves.

The inner and outer sensors 110, 112 for each of the cabinet shelf areas 102 may be suitably fitted to eliminate electromagnetic or RF interference with each other. In certain embodiments, different shelves 102 within a cabinet 100 may be configured to operate at different frequencies to avoid interference. In certain embodiments, the walls of the cabinet shelf area 102 may be designed to provide sufficient electrical isolation such that the NFC signals from one shelf area 102 do not interfere with the signals from another shelf area 102.

It is possible that during removal or storage of an item, a user may "hesitate," resulting in generation of multiple sensory messages for a particular inventory item 108 when in fact only one action of storage or removal takes place. In such a case, the processor 508 may receive multiple sensing messages from the sensors 110 and 112. The processor 508 is programmed to establish a "net" directionality of the movement of the inventory item 108 by looking at the earliest sensing and the latest sensing and ignoring the effect of any intermediate sensings by the inner and outer sensors as simply canceling each other out. Thus, for example, if time sequencing of sensing is: (1) inner, (2) inner, (3) outer, (4) inner, and (5) outer, then the processor can ignore the second "inner" sensing as being spurious, ignore the third reading (outer) and the fourth sensing (inner) as canceling each other out, and determining that the item was removed.

An advantage of the disclosed embodiments over current art is the possibility of reducing power consumption of the supply cabinet 600. Since the disclosed supply cabinet 600 only requires a sensor be able to sense items in close proximity, a low power wireless technology such as NFC technology can be used. A short-range wireless technology typically consumes and radiates very low power relative to All Cabinet Scan techniques. This low power feature is also advantageous in applications where inventory items 108 are radiation-sensitive devices. Furthermore, this reduces total power consumed by a supply cabinet, thereby resulting in significant savings in utility bills to a facility that deploys multiple supply cabinets.

Because the sensing is performed when an item is being stored or being removed, the actual location of the inventory item 108 on the cabinet shelf 104 is not significant. This offers an advantage over certain current techniques that require "line of sight" orientation of inventory items with respect to the sensors. In certain embodiments, inventory items 108 may be stacked together in any orientation. The inventory items may also be stacked one above the other such that they "hide" one another, without having to worry about erroneous inventory tracking.

A user may remove multiple inventory items 108 simultaneously. Such a use case is addressed by the disclosed embodiments of the supply cabinet 600 by including information about all items simultaneously sensed in the sensory message transmitted to the processor. The wireless communication techniques described above offer sufficient bandwidth of communication and sensory isolation of signals to/from RF tags to allow simultaneous sensing of multiple inventory items. The processor 508 may be configured to raise an alarm or log an error if a user either inadvertently or deliberately removes multiple inventory items. The alarm may notify the user that he should remove inventory items one at a time.

Although embodiments of the present invention have been described and illustrated in detail, it is to be clearly understood that the same is by way of illustration and example only and is not to be taken by way of limitation, the scope of the present invention being limited only by the terms of the appended claims.

What is claimed is:

1. A storage cabinet apparatus comprising:
at least one compartment having an opening for access to the compartment;
a first sensor positioned within the compartment to have a first zone of sensing; and
a second sensor positioned within the compartment to have a second zone of sensing;
wherein, compared to the second zone of sensing, the first zone of sensing is closer to the opening of the compartment; and
wherein the first sensor and the second sensor are configured to sense an inventory item in the first zone of sensing and the second zone of sensing respectively.

2. The storage apparatus of claim 1, further comprising:
a processor communicatively coupled to the first sensor and the second sensor;
wherein the first sensor and the second sensor are configured to send a signal to the processor in response to sensing an inventory item.

3. The storage apparatus of claim 2, wherein the processor is configured to determine storage and removal of an inventory item responsive to temporal locations of the sensing of the inventory item by the first sensor and the second sensor.

4. The storage apparatus of claim 2, wherein the processor updates an inventory database responsive to a directionality of the sensing of the inventory item by the first sensor and the second sensor.

5. The storage apparatus of claim 2, wherein the signal comprises a message having an item-dependent portion and an item-independent portion.

6. The storage apparatus of claim 5, wherein the item-dependent portion comprises an identity of the inventory item.

7. The storage apparatus of claim 6, wherein the identity comprises a character string.

8. The storage apparatus of claim 7, wherein the item-independent portion comprises a timestamp.

9. The storage apparatus in claim 1, wherein the first sensor uses a first wireless technology for sensing and the second sensor uses a second wireless technology for sensing.

10. The storage apparatus of claim 9, wherein the first wireless technology and the second wireless technology comprise the ISO-14443 near-field communication (NFC) standard.

11. A method of tracking inventory of items stored in a compartment of a supply cabinet, wherein the compartment comprises a single opening for access by a user, the method comprising the steps of:
receiving, at a processor, a first sensing message from a first sensor in the compartment and a second sensing message from a second sensor in the compartment that is spaced apart from the first sensor, the second sensor being closer to the opening of the compartment than the first sensor; and
updating, at the processor, an inventory database for items in the supply cabinet;
wherein said updating is responsive to time instants of sensing the inventory item at the first sensor and the second sensor, wherein said updating comprises removing the inventory item from the inventory database if sensing the inventory item at the first sensor occurred prior to sensing the inventory item at the second sensor, wherein said updating comprises adding the inventory item to the inventory database if sensing the inventory item at the first sensor occurred at or after sensing the inventory item at the second sensor.

12. The method in claim 11, wherein the wireless technology comprises a near-field (NFC) communication technology.

13. The method of claim 11, further comprising the step of:
issuing an alarm if said updating comprises removing and if the inventory item is of a predetermined type.

14. A secure storage apparatus for storing a plurality of inventory items, the secure storage apparatus comprising:
a supply cabinet comprising a compartment with a door;
a first sensor configured to sense a first region within the compartment;
a second sensor configured to sense a second region within the compartment, the second region disposed between the door and the first region; and
a processor communicatively coupled with the first sensor and the second sensor;
wherein the first sensor and the second sensor are further configured to sense proximate inventory items and communicate corresponding sensory messages to the processor;
wherein the processor is configured to:
restrict a user's ability to open the door;
determine that an inventory item was removed if the sensory message from the second sensor is received after the sensory message from the first sensor; and
issue an alarm if the user opening the door was not authorized to remove the inventory item.

15. The apparatus of claim 14, wherein the first sensor and the second sensor use a sensing technology comprising the ISO 14443 near-field communication (NFC) technology.

16. The apparatus of claim 14, wherein the alarm comprises one or more of an audible sound, a visible signal, and a computer log.

17. The apparatus of claim 14, wherein the processor is configured to allow a user to open the door only if the user presents a correct username/password combination.

18. The apparatus of claim 14, wherein the predetermined item is an expired or recalled medicinal item.

* * * * *